(12) United States Patent
Poncelet et al.

(10) Patent No.: US 9,657,209 B2
(45) Date of Patent: May 23, 2017

(54) SELF-DISPERSING NANOPARTICLES

(75) Inventors: Olivier Poncelet, Grenoble (FR);
Renaud Borlet, Saint Egreve (FR);
Daniel Getto, Le Fontanil (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 534 days.

(21) Appl. No.: 14/116,599

(22) PCT Filed: May 4, 2012

(86) PCT No.: PCT/IB2012/052248
§ 371 (c)(1),
(2), (4) Date: Jan. 14, 2014

(87) PCT Pub. No.: WO2012/153251
PCT Pub. Date: Nov. 15, 2012

(65) Prior Publication Data
US 2014/0158931 A1 Jun. 12, 2014

(30) Foreign Application Priority Data

May 11, 2011 (FR) ...................... 11 01434

(51) Int. Cl.
*C09K 5/00* (2006.01)
*C09K 5/10* (2006.01)
(Continued)

(52) U.S. Cl.
CPC ............. *C09K 5/10* (2013.01); *C01B 13/145* (2013.01); *C01F 7/02* (2013.01); *C01F 7/026* (2013.01);
(Continued)

(58) Field of Classification Search
CPC .......... C09K 5/10; C09K 5/14; C01B 13/145; C09C 1/3072; C09C 1/3676; C09C 1/407;
(Continued)

(56) References Cited

U.S. PATENT DOCUMENTS

| | | | |
|---|---|---|---|
| 2005/0048010 A1* | 3/2005 | Kliss | A61K 8/044 424/59 |
| 2008/0254295 A1* | 10/2008 | Hibst | A61K 8/27 428/407 |
| 2013/0130018 A1 | 5/2013 | Poncelet et al. | |

FOREIGN PATENT DOCUMENTS

| | | |
|---|---|---|
| FR | 2 955 043 | 7/2011 |
| WO | 2005/061602 | 7/2005 |

OTHER PUBLICATIONS

Gun'ko et al. "Influence of different treatments on characteristics of nanooxide powders alone or with adsorbed polar polymers or proteins", Powder Technology, 187, 2008, 146-158; published online Feb. 29, 2008/.*

(Continued)

*Primary Examiner* — Jane L Stanley
(74) *Attorney, Agent, or Firm* — Morgan, Lewis & Bockius LLP

(57) ABSTRACT

The invention relates to a process for manufacturing nanoparticles that are self-dispersing in water. It also relates to the self-dispersing nanoparticles obtained by the process of the invention and also a process for manufacturing a heat-transfer fluid containing the nanoparticles according to the invention or obtained by the process of the invention. The process of the invention comprises the following steps: a) optionally, manufacture of an aqueous dispersion of nanoparticles chosen from the nanoparticles of alumina ($Al_2O_3$), of zinc oxide (ZnO), of titanium oxide ($TiO_2$), of silica ($SiO_2$) and of beryllium oxide (BeO), b) addition to an aqueous dispersion of nanoparticles chosen from nanopar- (Continued)

ticles of alumina ($Al_2O_3$), of zinc oxide (ZnO), of titanium oxide ($TiO_2$), of silica ($SiO_2$) and of beryllium oxide (BeO), of a water-soluble polymer chosen from polyvinyl alcohols, polyethylene glycols, polyvinylpyrrolidones, polyoxazolines, starches, and mixtures of two or more thereof, and c) thermal quenching of the dispersion obtained in step b), and d) lyophilization of the quenched dispersion obtained in step c). The invention finds an application in the field of coolants in particular.

18 Claims, 1 Drawing Sheet

(51) Int. Cl.
  *C09K 5/14* (2006.01)
  *C01F 7/02* (2006.01)
  *C09C 1/30* (2006.01)
  *C09C 1/36* (2006.01)
  *C09C 3/10* (2006.01)
  *C08G 73/02* (2006.01)
  *C01B 13/14* (2006.01)
  *C08K 3/22* (2006.01)

(52) U.S. Cl.
  CPC .......... *C08G 73/0233* (2013.01); *C08K 3/22* (2013.01); *C09C 1/3072* (2013.01); *C09C 1/3676* (2013.01); *C09C 3/10* (2013.01); *C09K 5/14* (2013.01)

(58) Field of Classification Search
  CPC ... C09C 1/043; C09C 3/10; C01F 3/02; C01F 7/02
  USPC .......................................................... 252/73
  See application file for complete search history.

(56) References Cited

OTHER PUBLICATIONS

McHugh et al., Immune-Nanotoxicity of Zinc Oxide Nanoparticles: Design of an Inhibition-Base Investigation, MS Thesis Drexel University, pp. 17-18, 2010.

Manorama et al., Photostabilization of Dye on Anatase Titania Nanoparticles by Polymer Capping, Journal of Physics and Chemistry of Solids, 63, pp. 135-143, 2002.

Lai et al., Convective Heat Transfer for Water-Based Alumina Nanofluids in a Single 1.02-MM Tube, 11th Intersociety Conference on Thermal and Thermomechanical Phenomena in Electronic Systems, pp. 970-978, 2008.

Guo et al., Synthesis and Characterization of Poly(vinylpyrrolidone)-Modified Zinc Oxide Nanoparticles, Chemistry of Materials, 12, pp. 2268-2274, 2000.

Kumar et al., Synthesis and Characterization of a Micro Scale Zinc Oxide-PVA Composite by Ultrasound Irradiation and the Effect of Composite on the Crystal Growth of Zinc Oxide, Journal of Crystal Growth, 250, pp. 409-417, 2003.

\* cited by examiner

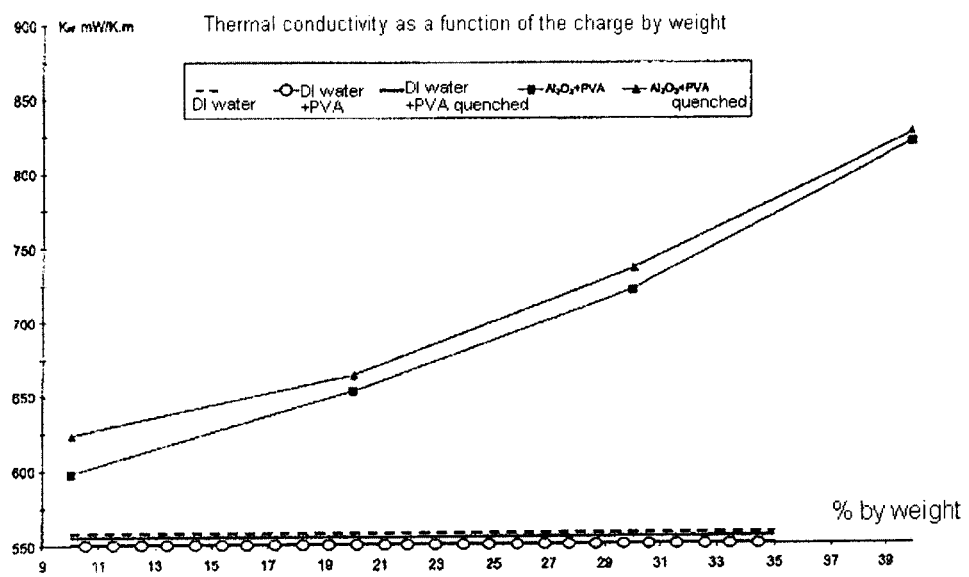

SELF-DISPERSING NANOPARTICLES

The invention relates to a process for manufacturing nanoparticles that are self-dispersing in water. It also relates to the self-dispersing nanoparticles obtained by means of the process of the invention and also to a process for manufacturing a heat-transfer fluid containing the nanoparticles of the invention or which are obtained by means of the process of the invention.

It also relates to the heat-transfer fluid comprising water and the nanoparticles of the invention or the nanoparticles obtained by means of the process of the invention.

In particular, the heat-transfer fluid of the invention can be obtained by injection, in situ, into the cooling circuit of the device to be cooled, containing water.

Nanofluids, i.e. fluids containing nanoparticles, in particular of an inorganic oxide, are fluids which contain oxide particles of which the size is less than one micrometer. The size of these particles can range down to a size as small as a few tens of nanometers.

These nanofluids are suspensions, or dispersions, or sols, or colloidal solutions, of nanoparticles.

These fluids are used in many fields.

They are in particular used as coolant (heat-transfer fluid) of various devices.

However, at the current time, nanofluids, which contain a large amount of water, must be manufactured beforehand and then transported and stored on the site of use and put in place in the device.

This poses a transport problem since the nanofluid already contains the aqueous heat-transfer fluid, which increases its bulk and its weight and risks causing leaks. It is difficult to transport and to store. Furthermore, during the storage period, there are risks of settling out due, for example, to bacterial contaminations or heat shocks, impairing the properties of the nanofluid.

Moreover, it is currently impossible to instantaneously disperse powders of nanometric size (i.e. compounds of particles of which the largest dimension is less than one micrometer), which have been previously dried, in a heat-transfer fluid, and in particular water. This is because the forces of cohesion which are exerted between the nanoparticles are impossible to overcome without using very energetic dispersion techniques. Furthermore, even if these techniques are applied, the final size distribution of the nanoparticles obtained is very broad.

As it happens, in the case of coolants, the thermal performance of the nanofluid, i.e. its thermal conductivity, correlates directly with the size or more precisely with the developed specific surface area of the nanoparticles with respect to the solvent, with the shape of the nanoparticles, and with the concentration of nanoparticles in the nanofluid.

The invention aims to solve the problem of obtaining powders of particles of nanometric size which are self-dispersing, i.e. which disperse by themselves in a carrier liquid, more precisely and more particularly in water.

The powders obtained may therefore be transported and used in situ and on demand, without generating additional transport and storage costs. Furthermore, when injected into the cooling circuit of a device, they will be immediately dispersed and will continue their cooling function without any stirring that would be obtained by virtue of recirculation pumps.

In the remainder of the text and the claims, the terms "self-dispersing nanoparticle(s)" denote the nanoparticles treated by means of the process of the invention and the term "nanoparticle(s)" denotes particles not yet treated by means of the process of the invention.

Thus, the terms "self-dispersing nanoparticle(s)" are intended to mean, in particular, nanoparticles which are in the form of porous aggregates also comprising at least one polymer as defined hereinafter in the context of the invention.

The aggregates may be in the form of porous beads of variable sizes, for example of porous beads having a diameter of between 10 µm and 1 cm, inclusive, more particularly of the order of 1 mm.

However, the terms "self-dispersing nanoparticle(s)" may, in particular when milling of the aggregates mentioned above is carried out, denote the powder consisting of nanoparticles individualized by milling and also comprising a polymer as defined hereinafter in the context of the invention.

To this effect, the invention provides a method for manufacturing a powder of oxides of nanometric size which is self-dispersing (self-dispersing nanoparticles) and also a process for manufacturing a coolant comprising them.

The powders of nanoparticles will more particularly be powders of alumina ($Al_2O_3$), of zinc oxide (ZnO), of titanium oxide ($TiO_2$), of silica ($SiO_2$) and of beryllium oxide (BeO).

Indeed, these powders have a thermal conductivity which makes them suitable for manufacturing a coolant.

However, the process for manufacturing self-dispersing nanoparticles of the invention is in no way limited to the manufacturing of only these oxide nanoparticles.

Consequently, a first subject of the invention is a process for manufacturing self-dispersing nanoparticles, characterized in that the nanoparticles are chosen from nanoparticles of alumina ($Al_2O_3$), of zinc oxide (ZnO), of titanium oxide ($TiO_2$), of silica ($SiO_2$) and of beryllium oxide (BeO) and in that it comprises the following steps:

a) optionally, manufacture of an aqueous dispersion of nanoparticles chosen from nanoparticles of alumina ($Al_2O_3$), of zinc oxide (ZnO), of titanium oxide ($TiO_2$), of silica ($SiO_2$) and of beryllium oxide (BeO), b) addition, to an aqueous dispersion of nanoparticles chosen from nanoparticles of alumina ($Al_2O_3$), of zinc oxide (ZnO), of titanium oxide ($TiO_2$), of silica ($SiO_2$) and of beryllium oxide (BeO), of a water-soluble polymer chosen from polyvinyl alcohols, polyethylene glycols, polyvinylpyrrolidones, polyoxazolines, starches, and mixtures of two or more thereof, c) thermal quenching of the dispersion obtained in step b), and d) lyophilization of the quenched dispersion obtained in step c).

Preferably, the water-soluble polymer in step b) is chosen from polyvinyl alcohols, polyethylene glycols and polyvinylpyrrolidones.

According to a first embodiment, the water-soluble polymer, in step b), is a polyvinyl alcohol having a molecular weight between 31 000 and 50 000 inclusive.

According to a second embodiment, the water-soluble polymer is poly(2-ethyloxazoline) with a weight-average molecular weight of 50 000 $g \cdot mol^{-1}$.

According to a third embodiment, the water-soluble polymer is a polyvinylpyrrolidone with a weight-average molecular weight of between 10 000 and 40 000 $g \cdot mol^{-1}$ inclusive.

According to a fourth embodiment, the water-soluble polymer is a polyethylene glycol having a weight-average molecular weight of between 7000 and 35 000 g·mol$^{-1}$ inclusive.

More preferably, the water-soluble polymer is a polyvinyl alcohol having a weight-average molecular weight of between 31 000 and 50 000 g·mol$^{-1}$ inclusive and the nanoparticles are nanoparticles of alumina or of zinc oxide and the nanoparticles/water-soluble polymer weight ratio is between 4.5 and 30 inclusive, preferably between 6 and 7 inclusive.

The process of the invention may also comprise, in addition, a step of milling of the aggregates of self-dispersing nanoparticles obtained after step d), when such aggregates are obtained.

The invention also provides self-dispersing nanoparticles capable of being obtained by means of the process according to the invention, chosen from self-dispersing nanoparticles of alumina, of zinc oxide, of titanium oxide, of silica oxide or of beryllium oxide and comprising a water-soluble polymer chosen from polyvinyl alcohols, polyethylene glycols, polyvinylpyrrolidones, polyoxazolines, starches, and mixtures of two or more thereof. These self-dispersing nanoparticles are instantaneously dispersible in water.

This or these "self-dispersing nanoparticle(s)" are instantaneously dispersible in water, whether they are in the form of porous aggregates obtained before milling or in the form of more or less individualized nanoparticles obtained after milling, if milling is carried out and if porous aggregates are obtained before milling.

Preferably, the water-soluble polymer is chosen from polyvinyl alcohols, polyethylene glycols and polyvinylpyrrolidones.

In a first embodiment, the water-soluble polymer is a polyvinyl alcohol having a weight-average molecular weight of between 31 000 and 50 000 g·mol$^{-1}$ inclusive.

In a second embodiment, the water-soluble polymer is a poly(2-ethyloxazoline) having a weight-average molecular weight of 50 000 g·mol$^{-1}$.

In a third embodiment, the water-soluble polymer is a polyvinylpyrrolidone having a weight-average molecular weight of between 10 000 and 40 000 g·mol$^{-1}$ inclusive.

In a fourth embodiment, the water-soluble polymer is a polyethylene glycol having a weight-average molecular weight of between 7000 and 35 000 g·mol$^{-1}$ inclusive.

In one preferred embodiment, the self-dispersing nanoparticles are chosen from nanoparticles of alumina and of zinc oxide, the water-soluble polymer is a polyvinyl alcohol having a weight-average molecular weight of between 31 000 and 50 000 g·mol$^{-1}$ inclusive and the nanoparticles/water-soluble polymer weight ratio is between 4.5 and 30 inclusive, preferably between 6 and 7 inclusive.

The invention also provides a process for manufacturing a dispersion of self-dispersing nanoparticles, characterized in that it comprises mixing self-dispersing nanoparticles according to the invention or obtained by means of the process according to the invention, in water.

In this process, the self-dispersing nanoparticles/water weight ratio is between 5% and 10% inclusive.

The invention further provides a heat-transfer fluid, characterized in that it comprises water and self-dispersing nanoparticles according to the invention or nanoparticles obtained by means of the process for manufacturing self-dispersing nanoparticles according to the invention.

The invention will be understood more clearly and other advantages and characteristics thereof will become more clearly apparent on reading the explanatory description which follows and which is given with reference to the appended single FIGURE which represents the change in the thermal conductivity of self-dispersing nanoparticles of alumina according to the invention or obtained by means of the process of the invention, injected into water, in comparison with the change in the thermal conductivity of water alone or of water containing a water-soluble polymer used for manufacturing the self-dispersing nanoparticles according to the invention or of a simple mixture of nanoparticles of alumina and of water-soluble polymer, as a function of the percentage by weight of self-dispersing nanoparticles according to the invention, or of water-soluble polymer, or of nanoparticles of alumina and of water-soluble polymer which are not treated according to the invention.

The self-dispersing nanoparticles of the invention are more particularly obtained from nanoparticles of beryllium oxide, of alumina, of zinc oxide, of titanium oxide or of silica.

Indeed, the thermal conductivities of these inorganic oxides are those which are of greatest interest as a coolant.

The thermal conductivities of these inorganic oxides, in W m$^{-1}$·K$^{-1}$ are reported in table 1 below:

TABLE 1

| Inorganic oxide | Thermal conductivity |
| --- | --- |
| BeO | 230 |
| Al$_2$O$_3$ | 40 |
| ZnO | 29 |
| TiO$_2$ | 8.4 |
| SiO$_2$ | 1.34 |

These thermal conductivities are the thermal conductivities of the inorganic oxides at 25° C.

Nanoparticles of α-alumina (α-Al$_2$O$_3$) are preferably used.

More preferably, these nanoparticles of α-alumina have the shape of platelets and a very precise particle size distribution.

The size of the particles is measured by differential light scattering (dls).

Thus, the particles of α-alumina which are preferably used in the invention are platelet-shaped particles, i.e. which have the shape of flat particles, the thickness of which is the smallest dimension and is less than or equal to 30 nm, preferably between 15 and 25 nm, and which have a precise size distribution:
  90% to 95% by number of the particles have a size less than or equal to 210 nm,
  50% by number of these 90% to 95% of particles have a size less than or equal to 160 nm. Preferably, furthermore, 10% by number of these 90% to 95% of particles have a size less than or equal to 130 nm.

In addition to this particular particle size distribution, the nanoparticles of α-alumina which are preferably used in the invention have a size between 300 and 60 nm.

The term "size" is intended to mean the largest dimension of these nanoparticles, and typically their average diameter. This size is measured by transmission microscopy.

A particularly preferred example of such an alumina is the BA15PS® alumina sold by the company Baikowski.

The BA15PS® alumina is a crystalline α-alumina which does not contain parasitic phases and which is in the shape of platelets, the size distribution of which is such that 90% to 95% of the nanoparticles have a size less than or equal to 210 nm, and that, among 90% to 95% of nanoparticles, 50% have a size less than or equal to 160 nm and only 10% of these 90% to 95% of nanoparticles have a size less than or equal to 130 nm.

By way of indication, the thermal conductivity of water alone, at 25° C., is 0.608 W m$^{-1}$·K$^{-1}$.

The process for manufacturing self-dispersing nanoparticles according to the invention consists in treating an aqueous dispersion of the desired nanoparticles in order to obtain self-dispersing nanoparticles in the form of powder which will be self-dispersing.

In the invention, the term "aqueous dispersion" is intended to mean any stable suspensions, colloidal solutions or sols of nanoparticles.

It will be possible to manufacture this starting aqueous dispersion or alternatively to use an already manufactured aqueous dispersion.

The process of the invention therefore consists in adding a water-soluble polymer which has no chemical interaction either with the water or with the nanoparticles in this suspension.

This means that the water-soluble polymer used must not chemically or physically modify the nanoparticles, in particular when said nanoparticles are in their solvent, in this case more particularly water.

In the case of the nanoparticles of beryllium oxide, of alumina, of zinc oxide, of titanium oxide and of silica, the water-soluble polymer will preferably be chosen from polyvinyl alcohols (PVAs), polyethylene glycols (PEGs), polyvinylpyrrolidones (PVPs), polyoxazolines and starches.

Mixtures thereof may be used.

Thermal quenching of the dispersion obtained containing the nanoparticles and the water-soluble polymer is then carried out, followed by lyophilization of this quenched dispersion. The self-dispersing nanoparticles according to the invention are then obtained.

The quenching is thermal quenching. The term "thermal quenching" is intended to mean in particular quenching at a temperature below −80° C., preferably below −100° C. and more preferably at a temperature of the order of −180° C.

According to one preferred embodiment of the process of the invention, the thermal quenching is carried out by bringing the dispersion into contact with liquid nitrogen.

The nanoparticles obtained may be in the form of porous aggregates of several nanoparticles. The obtaining of aggregates is an advantage since they are easier to handle and are less of a health and safety problem. These aggregates can, however, be subsequently milled. However, each individual grain constituting these aggregates is a self-dispersing nanoparticle according to the invention and, when the aggregates are resuspended in water, they redisperse as self-dispersing nanoparticles having the same size as the nanoparticles used at the start.

Consequently, the terms "self-dispersing nanoparticle(s)" and "porous aggregates of nanoparticles" are equivalent, according to one preferred embodiment of the invention.

As water-soluble polymer, use will preferably be made of polyvinyl alcohols, polyethylene glycols and polyvinylpyrrolidones since these polymers are readily available and also easy to process.

The amount of water-soluble polymer to be added to the aqueous suspension of nanoparticles during the implementation of the process of the invention can be very variable, depending on the intended final use of the self-dispersing nanoparticles ultimately obtained when they are injected and self-dispersed in a fluid or solvent, in particular water.

This amount will depend in particular on the desired viscosity of the final fluid.

In the more particular case of coolants, and where the viscosity may be an important factor, in particular for the circulation of the fluid, when the cooling recirculation pumps are stopped, use will preferably be made of the following water-soluble polymers:
polyvinyl alcohols having a weight-average molecular weight of 31 000 to 50 000 g·mol$^{-1}$ inclusive, or
poly(2-ethyloxazoline) having a weight-average molecular weight of 50 000 g·mol$^{-1}$, or
polyvinylpyrrolidones having a weight-average molecular weight of between 10 000 and 40 000 g·mol$^{-1}$, or
polyethylene glycols having a weight-average molecular weight of between 7000 and 35 000 g·mol$^{-1}$.

Still in the case where the self-dispersing nanoparticles according to the invention are obtained from nanoparticles of alumina or of zinc oxide, use will preferably be made, as water-soluble polymer, of a polyvinyl alcohol having a weight-average molecular weight of between 31 000 and 51 000 g/mol$^{-1}$ inclusive, at a nanoparticles/water-soluble polymer weight ratio of between 4.5 and 30, inclusive, preferably of between 6 and 7, inclusive.

The self-dispersing nanoparticles capable of being obtained by means of the process of the invention are also a subject of the invention.

These self-dispersing nanoparticles are characterized in that they comprise a water-soluble polymer preferably chosen from polyvinyl alcohols, polyethylene glycols, polyvinylpyrrolidones, polyoxazolines, starches, and mixtures of two or more thereof. Preferably, in the case where they are intended to be used for reconstituting coolants, the water-soluble polymer is chosen from polyvinyl alcohols, polyethylene glycols and polyvinylpyrrolidones.

Likewise preferably, the water-soluble polymer present for forming the self-dispersing nanoparticles of the invention will preferably have weight-average molecular weights of between 31 000 and 50 000 g·mol$^{-1}$ for the polyvinyl alcohols, of approximately 50 000 g·mol$^{-1}$ for the poly(2-ethyloxazoline), between 10 000 and 40 000 g·mol$^{-1}$ for the polyvinylpyrrolidones and between 7000 and 35 000 g·mol$^{-1}$ for the polyethylene glycols.

Still preferably, the self-dispersing nanoparticles of the invention will contain a nanoparticles/water-soluble polymer weight ratio of between 4.5 and 30 inclusive, preferably between 6 and 7 inclusive.

The self-dispersing nanoparticles of the invention or obtained by means of the process of the invention are self-dispersing and can therefore be used for the manufacture of a heat-transfer fluid (coolant).

Thus, the invention relates to a process for manufacturing a heat-transfer fluid, which comprises a simple step of injection of the self-dispersing nanoparticles into the cooling circuit of a device to be cooled containing the carrier liquid, preferably water.

The self-dispersing nanoparticles of the invention or obtained by means of the process of the invention will, in the case of a heat-transfer fluid, be present in an amount by weight of between 5% and 10% relative to the total weight of the self-dispersing nanoparticles according to the invention or obtained by means of the process of the invention/water.

Indeed, this amount is sufficient to provide the same cooling capacity as a nanofluid not treated by means of the process of the invention, containing 17% by weight of nanoparticles.

This is shown in FIG. 1, by comparing the curve of the change in thermal conductivity as a function of the charge by weight represented by the curve  of the self-dispersing nanoparticles of the invention, and the curve represented by ․▬▬․ which shows the change in thermal conductivity of a fluid consisting of water and of particles of aluminas and of water-soluble polymer, not treated according to the invention.

The heat-transfer fluid obtained with the self-dispersing nanoparticles according to the invention or obtained by means of the process according to the invention is also a subject of the invention.

This heat-transfer fluid comprises water and self-dispersing nanoparticles according to the invention or obtained by means of the process according to the invention, preferably containing between 5% and 10% by weight of self-dispersing nanoparticles according to the invention or obtained by means of the process according to the invention, relative to the total weight of self-dispersing nanoparticles according to the invention or obtained by means of the process according to the invention+water.

The heat-transfer fluid of the invention is obtained by injection, directly into the cooling circuit of the device to be cooled, containing water, of the self-dispersing nanoparticles according to the invention or obtained by means of the process according to the invention.

In order for the invention to be understood more clearly, several exemplary embodiments thereof will now be described purely by way of nonlimiting illustration.

EXAMPLE 1

Synthesis of Nanoparticles of Alumina, According to the Invention 5 g of polyvinyl alcohol (PVA) with a weight-average molecular weight of between 31 000 and 50 000 g·mol$^{-1}$ (Fluka: PVA 4-88), in powder form, are added to 95 ml of DI water and the reaction medium is stirred for 1 h at 50° C. until complete dissolution of the polymer.

The PVA solution is added at ambient temperature to 45.33 g of an aqueous colloidal sol of Baikowski BA15PS® α-alumina, of which the alumina titer by weight is 75%.

The reaction medium is milky white, and very homogeneous without any formation of precipitate. After 1 h of mixing at ambient temperature, the thermal conductivity is then measured at 20° C. (in a thermostatic bath) using a K2D Pro apparatus.

The same reaction medium is then added dropwise to liquid nitrogen (5 l Dewar); the diameter of the drops is approximately 5 mm. The beads obtained after quenching in the liquid nitrogen are then filtered off on a plastic Buchner funnel. They are weighed and lyophilized for 48 h. After this lyophilization, porous aggregates of self-dispersing nanoparticles are obtained, these aggregates having the shape and the size of the drops introduced into the liquid nitrogen. Of course, the size and the shape of the drops added to the liquid nitrogen, and therefore of the aggregates obtained, can be modified, in particular by using a means for injecting the drops into the liquid nitrogen which modifies this shape, or alternatively according to the quenching technique used.

The lyophilization generally lasts 48 h. After 36 h, the lyophilization is stopped and the beads are weighed. They are then re-lyophilized for 12 h, and then they are re-weighed. It is considered that the lyophilization is complete if the variation in weight between t36 h and t48 h does not exceed 0.005%, typically 0.5 g for 100 g of material used. The beads are then packaged under argon and stored at ambient temperature.

The polyvinyl alcohol used here has a molecular weight <100 000.

Above this molecular weight, it is necessary to use a longer mixing time, at ambient temperature, for the polyvinyl alcohol in the colloidal sol of nanoparticles.

The aggregates obtained in this example after the lyophilization have the size of drops of approximately 5 mm in diameter.

After the lyophilization, the dry beads retain the same size.

It should be noted that the polyvinyl alcohol/colloidal suspension order of addition does not in any way modify the result obtained, just like heating or increasing the polyvinyl alcohol+aqueous colloidal sol mixing time.

EXAMPLE 2

The process was carried out as in example 1, except that the amount of polyvinyl alcohol added was 2.5 g, which corresponds to an Al$_2$O$_3$/PVA weight ratio of 13.6.

EXAMPLE 3

The process was carried out as in example 1, but adding only 1.5 g by weight of PVA.

EXAMPLE 4

The process was carried out as in example 1, but adding 7 g of PVA.

The weight of alumina, the weight of PVA, the alumina/PVA weight ratio, the percentage by weight relative to the total dispersion obtained of Al$_2$O$_3$ and the percentage by total weight relative to the total weight of the dispersion obtained in the end for examples 1 to 4 are reported in table 2 hereinafter:

TABLE 2

| Sample | Weight Al$_2$O$_3$ (g) | Weight PVA (g) | Al$_2$O$_3$/PVA by weight | % Al$_2$O$_3$ by total weight (dispersion) | % PVA by total weight (dispersion) |
|---|---|---|---|---|---|
| Example 1 | 34 | 5 | 6.8 | 11.32 | 1.6 |
| Example 2 | 34 | 2.5 | 13.6 | 11.32 | 0.8 |
| Example 3 | 34 | 1.25 | 27.2 | 11.32 | 0.4 |
| Example 4 | 34 | 7 | 4.85 | 11.32 | 2.3 |

EXAMPLE 5

In this example, poly(ethyl-2-oxazoline) with a molecular weight of 50 000 was used as water-soluble polymer.

5 g of poly(ethyl-2-oxazoline); Aldrich: MW 50 000 g·mol$^{-1}$, in powder form, are added to 95 ml of DI water and the reaction medium is stirred for 1 h at 50° C. until complete dissolution of the polymer.

The poly(ethyl-2-oxazoline) solution is added at ambient temperature to 45.33 g of an aqueous colloidal sol of Baikowski BA15PS® α-alumina; the alumina titer by weight is 75%.

The reaction medium is milky white, and very homogeneous without any formation of precipitate. After 1 h of mixing at ambient temperature, the thermal conductivity is then measured at 20° C. using a K2D Pro apparatus.

The same reaction medium is then added dropwise to liquid nitrogen (5 l Dewar); the diameter of the drops is approximately 5 mm. The beads obtained (aggregates of self-dispersing nanoparticles) after quenching in liquid nitrogen are then filtered off on a plastic Buchner funnel. They are weighed and lyophilized for 48 h.

The lyophilization generally lasts 48 h. After 36 h, the lyophilization is stopped and the beads are weighed. They are then re-lyophilized for 12 h, and are then re-weighed. It is considered that the lyophilization is complete if the variation in weight between t36 h and t48 h does not exceed 0.005%, typically 0.5 g for 100 g of material used. The beads are then packaged under argon and stored at ambient temperature.

EXAMPLE 6

Polyvinyl alcohol having a weight-average molecular weight of between 9000 and 10 000 g·mol$^{-1}$, which was dissolved beforehand in water, was used as water-soluble polymer.

5 g of polyvinyl alcohol (Aldrich: MW 9000-10 000), in powder form, are added to 95 ml of DI water and the reaction medium is stirred for 1 h at 50° C. until complete dissolution of the polymer.

The PVA solution is added at ambient temperature to 45.33 g of an aqueous colloidal sol of Baikowski BA15PS® α-alumina; the alumina titer by weight is 75%.

The reaction medium is milky white, and very homogeneous without any formation of precipitate. After 1 h of mixing at ambient temperature, the thermal conductivity is then measured at 20° C. using a K2D Pro apparatus.

The same reaction medium is then added dropwise to liquid nitrogen (5 l Dewar); the diameter of the drops is approximately 5 mm. The beads obtained after quenching in liquid nitrogen are then filtered off on a plastic Buchner funnel. They are weighed and lyophilized for 48 h.

The lyophilization generally lasts 48 h. After 36 h, the lyophilization is stopped and the beads are weighed. They are then re-lyophilized for 12 h, and are then re-weighed. It is considered that the lyophilization is complete if the variation in weight between t36 h and t48 h does not exceed 0.005%, typically 0.5 g for 100 g of material used. The beads are then packaged under argon and stored at ambient temperature.

EXAMPLE 7 (COMPARATIVE)

In this example, a polyvinyl alcohol having a weight-average molecular weight of 89 000 to 98 000 g·mol$^{-1}$ was used as water-soluble polymer.

5 g of polyvinyl alcohol (Aldrich: MW 89 000-98 000 g·mol$^{-1}$), in powder form, are added to 95 ml of DI water and the reaction medium is stirred for 1 h at 50° C. until complete dissolution of the polymer.

The PVA solution is added at ambient temperature to 45.33 g of an aqueous colloidal sol of Baikowski BA15PS® α-alumina; the alumina titer by weight is 75%.

The reaction medium is milky white, and is very homogeneous without any formation of precipitate. After 1 h of mixing at ambient temperature, the thermal conductivity is then measured at 20° C. using a K2D Pro apparatus.

The same reaction medium is then added dropwise to liquid nitrogen (5 l Dewar); the diameter of the drops is approximately 5 mm. The beads obtained after quenching in liquid nitrogen are then filtered off on a plastic Buchner funnel. They are weighed and lyophilized for 48 h.

The lyophilization generally lasts 48 h. After 36 h, the lyophilization is stopped and the beads are weighed. They are then re-lyophilized for 12 h, and are then re-weighed. It is considered that the lyophilization is complete if the variation in weight between t36 h and t48 h does not exceed 0.005%, typically 0.5 g for 100 g of material used. The beads are then packaged under argon and stored at ambient temperature.

EXAMPLE 8 (COMPARATIVE)

In this example, water-soluble polymer was not added to the colloidal suspension of alumina, which was simply quenched and lyophilized.

EXAMPLE 9 (COMPARATIVE)

In this example, water-soluble polymer was not used and the colloidal sol of alumina was simply dried, without quenching treatment or lyophilization.

EXAMPLE 10 (COMPARATIVE)

In this example, a colloidal sol of zinc oxide was used without the addition of water-soluble polymer. The colloidal sol of zinc oxide was then quenched in liquid nitrogen and then lyophilized.

EXAMPLE 11 (COMPARATIVE)

In this example, a colloidal sol of zinc was used without the addition of water-soluble polymer. The colloidal sol of zinc was simply dried at ambient temperature.

EXAMPLE 12

In this example, the process of the invention was applied to the colloidal sol of zinc oxide used in examples 10 and 11.

1.25 g of PVA (Fluka: 4-88) are added to 33.75 g of DI water, and the mixture is stirred at ambient temperature until the PVA has completely dissolved. The PVA solution is added at ambient temperature to 50 g of a Nyacol aqueous colloidal ZnO sol, the ZnO titer by weight of which is 17%. The reaction medium is milky white, and is very homogeneous without any formation of precipitate. After 1 h of mixing at ambient temperature, the thermal conductivity is then measured at 20° C. using a K2D Pro apparatus.

The same reaction medium is then added dropwise to liquid nitrogen (5 l Dewar); the diameter of the drops is approximately 5 mm. The beads obtained after quenching in liquid nitrogen are then filtered off on a plastic Buchner funnel. They are weighed and lyophilized for 48 h. The lyophilization generally lasts 48 h. After 36 h, the lyophilization is stopped and the beads are weighed. They are then re-lyophilized for 12 h and are then re-weighed. It is considered that the lyophilization is complete if the variation in weight between t36 h and t48 h does not exceed 0.005%, typically 0.5 g for 100 g of material used. The beads (aggregates) obtained are then packaged under argon and stored at ambient temperature.

EXAMPLE 13

In this example, the process was carried out as in example 12, but adding only 0.75 g of water-soluble polymer, which in this case is PVA.

0.75 g of PVA (Fluka: 4-88) is added to 33.75 g of DI water, and the mixture is stirred at ambient temperature until the PVA has completely dissolved. The PVA solution is added at ambient temperature to 50 g of a Nyacol aqueous colloidal ZnO sol, the ZnO titer by weight of which is 17%. The reaction medium is milky white, and very homogeneous without any formation of precipitate. After 1 h of mixing at ambient temperature, the thermal conductivity is then measured at 20° C. using a K2D Pro apparatus.

The same reaction medium is then added dropwise to liquid nitrogen (5 l Dewar); the diameter of the drops is approximately 5 mm. The beads obtained after quenching in liquid nitrogen are then filtered off on a plastic Buchner funnel. They are weighed and lyophilized for 48 h. The lyophilization generally lasts 48 h. After 36 h, the lyophilization is stopped and the beads are weighed. They are then re-lyophilized for 12 h and are then re-weighed. It is considered that the lyophilization is complete if the variation in weight between t36 h and t48 h does not exceed 0.005%, typically 0.5 g for 100 g of material used. The beads are then packaged under argon and stored at ambient temperature.

EXAMPLE 14

The self-dispersing nanoparticles obtained in the previous examples were then redispersed according to the following protocol:

5 g of beads are placed on a 125 ml filter funnel with a porosity of 1 (diameter corresponding to the largest pores: 101 to 160 microns), the diameter of the sintered plate being 60 mm, the whole assembly being mounted on a vacuum flask. 100 ml of DI water are then added, said water is then left for 20 seconds without stirring and then filtration is carried out. Since the residue remains on the sintered plate, said residue is then dried and then weighed.

The dispersibility properties of the various nanoparticles obtained in examples 1 to 13 are grouped together in the following table 3:

TABLE 3

| Samples | Weight recovered on the sintered plate | Observations regarding "dispersibility" |
|---|---|---|
| $Al_2O_3$ | | |
| Example 1 | <<0.1 g | Very good "dispersibility" |
| Example 2 | <<0.1 g | Very good "dispersibility" |
| Example 3 | 0.8-1 g | Medium "dispersibility" |
| Example 4 | <<0.1 g | Very good "dispersibility" |
| Example 5 | <<0.1 g | Very good "dispersibility" |
| Example 6 | 0.8-1 g | Medium "dispersibility" |
| Example 7 | 3 g | Poor "dispersibility" |
| Example 8 | 4 g | Poor "dispersibility" |
| Example 9 | 4.5 g-5 g | Very poor "dispersibility" |
| ZnO | | |
| Example 10 | 3-4 g | Poor "dispersibility" |
| Example 11 | 4 g | Poor "dispersibility" |
| Example 12 | 0.3 g | Very good "dispersibility" |
| Example 13 | 0.5 g | Very good "dispersibility" |

The variations in the thermal conductivity of various fluids as a function of the weight of nanoparticles added to these fluids were then studied.

For this, the variation in thermal conductivity as a function of the weight of nanoparticles and/or of water-soluble polymer added:
of deionized water alone,
of deionized water containing 1.6% by weight of polyvinyl alcohol water-soluble polymer having a weight-average molecular weight of between 31 000 and 51 000 g·mol$^{-1}$, inclusive,
of a mixture of deionized water+alumina containing 10% by weight of BA15PS® α-alumina,
of a mixture of deionized water and alumina nanoparticles not treated by means of the process of the invention, which is the mixture of example 1 before the quenching treatment, lyophilization and redispersion and of 1.6% by weight, relative to the total weight of the water+colloidal sol+alumina nanoparticles+water-soluble polymer suspension, of polyvinyl alcohol having a weight-average molecular weight of 31 000 to 51 000 g·mol$^{-1}$, and
of a heat-transfer fluid according to the invention containing the self-dispersing nanoparticles according to the invention obtained in example 1, was measured.

The results are represented in the form of curves in FIG. 1.

The curve of variation of thermal conductivity of deionized water alone serves as a reference.

It is observed, from FIG. 1, that the heat-transfer fluid consisting only of polyvinyl alcohol in deionized water exhibits a slight drop in thermal conductivity compared with water. This is consistent, since the thermal conductivity of water-soluble polymers is 0.1 W m$^{-1}$ K$^{-1}$.

Any addition, to a system, of a thermal conductor which is not as good leads to a drop in the thermal conductivity of the mixture proportionally to the ratios of the constituents.

It is also noted from FIG. 1 that, when a mixture of water+1.6% by weight of polyvinyl alcohol is quenched and lyophilized and deionized water is added so as to again obtain a concentration by weight of 1.6% of polyvinyl alcohol, the thermal conductivity moves slightly closer to the thermal conductivity of deionized water alone, but remains below it.

It is also noted that, by using self-dispersing nanoparticles according to the invention, or obtained by means of the process according to the invention, the thermal conductivity of the fluid obtained is further improved.

However, entirely unexpectedly, it is especially noted that, at the low concentrations by weight (≤10%) of self-dispersing nanoparticles according to the invention or obtained by means of the process of the invention, the heat-transfer fluid according to the invention shows a thermal conductivity which is much higher than a nanofluid containing the same amounts of alumina and of polyvinyl alcohol but not treated by means of the process of the invention.

Thus, the process of the invention makes it possible to increase the thermal conductivity of a nanofluid.

With a concentration by weight of 10% of self-dispersing nanoparticles of alumina according to the invention, the nanofluid of the invention behaves like a fluid containing 17% by weight of nanoparticles. There is therefore a considerable increase in the thermal conductivity relative to the weight of material used. Furthermore, being able to work at a lower charge makes it possible to minimize the problems of settling out and/or of abrasiveness which occur when the charge is too great.

This is true both with the self-dispersing nanoparticles according to the invention containing alumina and the water-soluble polymer, and with the self-dispersing nanoparticles according to the invention comprising zinc oxide and the water-soluble polymer.

This is shown by table 4 hereinafter which shows the thermal conductivities of nanoparticles of zinc oxide before treatment according to the invention, after treatment according to the invention and after a storage period of 15 days.

TABLE 4

| Samples 10% by weight | Thermal conductivity before conditioning Wm$^{-1}$K$^{-1}$ | Thermal conductivity after conditioning Wm$^{-1}$K$^{-1}$ | Thermal conductivity after conditioning (15 d) Wm$^{-1}$K$^{-1}$ |
|---|---|---|---|
| ZnO | | | |
| Example 12 (10%) by weight | 0.572 | 0.590 | 0.590 |
| Example 13 | 0.572 | 0.590 | 0.590 |
| Al$_2$O$_3$ | | | |
| Example 1 | 0.595 | 0.620 | 0.620 |
| Example 2 | 0.595 | 0.624 | 0.62 |
| Example 3 | 0.570 | 0.570 | 0.570 |
| Example 4 | 0.550 | 0.550 | 0.550 |
| Example 5 | 0.60 | 0.630 | 0.630 |
| Example 6 | 0.570 | 0.570 | 0.570 |
| Example 7 | 0.57 | 0.57 | 0.57 |

It is also seen, from FIG. 1, that the addition of nanoparticles of aluminum oxides to deionized water containing polyvinyl alcohol clearly increases the thermal conductivity of the resulting fluid and that this thermal conductivity is directly proportional to the amount of oxides added.

Moreover, the size of the self-dispersing nanoparticles according to the invention and the size of the same nanoparticles before treatment according to the process of the invention were measured.

The process for manufacturing the nanoparticles according to the invention affects the particle size distribution and the size of the self-dispersing nanoparticles little or not at all, when said particles are redispersed in water.

The invention claimed is:

1. A process of manufacturing self-dispersing nanoparticles of a metal oxide, comprising:
    a step of addition of a water-soluble polymer to a dispersion of nanoparticles;
    a step of thermal quenching of the resulting dispersion in liquid nitrogen, wherein the step of thermal quenching comprises adding the resulting dispersion dropwise to the liquid nitrogen to form beads; and
    a step of lyophilization of the quenched dispersion obtained, and
comprising, optionally, a step of manufacture of the dispersion of said nanoparticles, before the step of addition of the water-soluble polymer,
    wherein the dispersion of nanoparticles is an aqueous dispersion of nanoparticles selected from the group consisting of nanoparticles of alumina (Al$_2$O$_3$), of zinc oxide (ZnO), of titanium oxide (TiO$_2$), of silica (SiO$_2$) and of beryllium oxide (BeO), and
    the water-soluble polymer is selected from the group consisting of polyvinyl alcohols, polyethylene glycols, polyvinylpyrrolidones, polyoxazolines, starches, and mixtures of two or more thereof.

2. The process of claim 1 wherein the water-soluble polymer is selected from the group consisting of polyvinyl alcohols, polyethylene glycols and polyvinylpyrrolidones.

3. The process of claim 1 wherein the water-soluble polymer is a polyvinyl alcohol having a weight-average molecular weight of between 31000 and 50000 g·mol$^{-1}$ inclusive.

4. The process of claim 1 wherein the water-soluble polymer is poly(2-ethyloxazoline) with a weight-average molecular weight of 50000 g·mol$^{-1}$.

5. The process of claim 1 wherein the water-soluble polymer is a polyvinylpyrrolidone with a weight-average molecular weight of between 10000 and 40000 g·mol$^{-1}$ inclusive.

6. The of claim 1 wherein the water-soluble polymer is a polyethylene glycol having a weight-average molecular weight of between 7000 and 35000 g·mol$^{-1}$ inclusive.

7. The process of claim 1 wherein
    the water-soluble polymer is a polyvinyl alcohol having a weight-average molecular weight of between 31000 and 50000 g·mol$^{-1}$ inclusive,
    the nanoparticles are nanoparticles of alumina or of zinc oxide, and
    the nanoparticles/water-soluble polymer weight ratio is between 4.5 and 30 inclusive.

8. The process of claim 7 wherein the nanoparticles/water-soluble polymer weight ratio is between 6 and 7 inclusive.

9. The process of claim 1 further comprising a step of milling of the aggregates obtained after lyophilization of the quenched dispersion, when such aggregates are obtained after this step.

10. Self-dispersing nanoparticles obtained by the process as claimed in claim 1, characterized
    in that said self-dispersing nanoparticles are selected from the group consisting of self-dispersing nanoparticles of alumina, of zinc oxide, of titanium oxide, of silica oxide and of beryllium oxide,
    in that said self-dispersing nanoparticles comprise a water-soluble polymer which is polyvinyl alcohol, and
    in that said self-dispersing nanoparticles are instantaneously dispersible in water.

11. The self-dispersing nanoparticles of claim 10 wherein the polyvinyl alcohol has a weight-average molecular weight of between 31000 and 50000 g·mol$^{-1}$ inclusive.

12. A process of manufacturing a dispersion of self-dispersing nanoparticles, comprising mixing self-dispersing nanoparticles obtained by the process as claimed in claim 1, in water.

13. The process of claim 12 wherein the self-dispersing nanoparticles/water weight ratio is between 5/100 and 10/100 inclusive.

14. A heat-transfer fluid comprising water and self-dispersing nanoparticles obtained by the process as claimed in claim 1.

15. The process of claim 1 wherein the step of thermal quenching is performed at a temperature below −180° C.

16. A process of manufacturing self-dispersing nanoparticles of a metal oxide, comprising:
    a step of addition of a water-soluble polymer to a dispersion of nanoparticles;
    a step of thermal quenching of the resulting dispersion at a temperature below −80° C.; and
    a step of lyophilization of the quenched dispersion obtained, and
comprising, optionally, a step of manufacture of the dispersion of said nanoparticles, before the step of addition of the water-soluble polymer,
    wherein the dispersion of nanoparticles is an aqueous dispersion of nanoparticles selected from the group consisting of nanoparticles of alumina (Al$_2$O$_3$), of zinc oxide (ZnO), of titanium oxide (TiO$_2$), of silica (SiO$_2$) and of beryllium oxide (BeO), and
    the water-soluble polymer is poly(2-ethyloxazoline) with a weight-average molecular weight of 50000 g·mol$^{-1}$.

17. The process of claim 16 wherein the nanoparticles are nanoparticles of alumina or of zinc oxide, and the nanoparticles/water-soluble polymer weight ratio is between 4.5 and 30 inclusive.

18. The process of claim 16 further comprising a step of milling of the aggregates obtained after lyophilization of the quenched dispersion, when such aggregates are obtained after this step.

* * * * *